United States Patent [19]

von Seyerl

[11] Patent Number: 4,621,128

[45] Date of Patent: Nov. 4, 1986

[54] HARDENER SOLUTION FOR EPOXIDE RESIN MASSES

[75] Inventor: Joachim von Seyerl, Seeon, Fed. Rep. of Germany

[73] Assignee: SKW Trostberg Aktiengesellschaft, Trostberg, Fed. Rep. of Germany

[21] Appl. No.: 673,164

[22] Filed: Nov. 19, 1984

[30] Foreign Application Priority Data

Sep. 9, 1983 [DE] Fed. Rep. of Germany ........ 3332553

[51] Int. Cl.[4] ............................................. C08G 59/50
[52] U.S. Cl. ...................................... 528/93; 528/123; 528/407; 252/182
[58] Field of Search .......................... 528/123, 407, 93; 252/182

[56] References Cited

U.S. PATENT DOCUMENTS

| | | | |
|---|---|---|---|
| 3,679,465 | 7/1972 | Flynn | 117/126 GE |
| 4,032,358 | 6/1977 | Hussain | 528/123 X |
| 4,111,909 | 9/1978 | Simons | 528/123 |
| 4,311,753 | 1/1982 | Pucci | 528/103 X |
| 4,314,002 | 2/1982 | Oizumi et al. | 428/460 X |
| 4,327,143 | 4/1982 | Alvino et al. | 428/251 X |
| 4,492,730 | 1/1985 | Oishi et al. | 428/460 X |

FOREIGN PATENT DOCUMENTS 3026706 2/1981 Fed. Rep. of Germany .
2055842 3/1981 United Kingdom .

OTHER PUBLICATIONS

Lee et al., "Epoxy Resins", McGraw-Hill, New York, 1957, page 110 T. P. 986, E6 L4.

Primary Examiner—Earl Nielsen
Attorney, Agent, or Firm—Felfe & Lynch

[57] ABSTRACT

The present invention provides a hardener solution for epoxide resin masses, based on dicyandiamide, wherein it contains
(a) 50 to 90 parts by weight of dimethylformamide,
(b) 5 to 50 parts by weight of a low boiling ketone and/or alcohol and
(c) 5 to 32 parts by weight of dicyandiamide, referred to 100 parts by weight of the sum of components (a) and (b).

9 Claims, No Drawings

HARDENER SOLUTION FOR EPOXIDE RESIN MASSES

The present invention is concerned with a hardener solution for epoxide resin masses, as well as with the use of this solution for the production of storage-stable epoxide resin solutions and especially of those which are to be used for the impregnation of glass fibre-reinforced fabrics.

On the basis of their outstanding properties, such as high impact strength and abrasion resistance, excellent adhesiveness to most raw materials, as well as a good stability towards light, water and chemicals, epoxide resins possess numerous possibilities of use and are used, in particular, as coating resins, casting resins and varnishes for printed circuit boards, as well as for adhesives and reinforced plastics.

For the production of glass-fibre reinforced laminates, epoxide resin mixtures are also produced which, as a rule, consist of a conventional epoxide resin or epoxide resin mixture, a hardener and possibly a hardening accelerator, as well as a definite amount of a solvent or of a solvent mixture for the adjustment of a definite viscosity. In many, cases, dicyandiamide is used as hardner (cf. U.S. Pat. Nos. 2,637,715 and 3,391,113), which can possibly contain a hardening accelerator, for example dimethylbenzylamine, 2-methylimidazole or tetraalkylguanidines.

A solvent or solvent mixture which is capable of completely dissolving all the components of the epoxide resin mixture in order to obtain a homogeneous distribution on the fabric to be impregnated, as well as a uniform hardening of the impregnated fabric, consists, according to German Democratic Republic Patent Specification No. 133,955, of glycol ethers, for example methyl or ethyl glycol, which, according to Federal Republic of Germany Patent Specification No. 30 26 706, can contain other solvents, such as aromatic hydrocarbons, alkylformamides or ketones.

One of the main disadvantages of the glycol ethers is the limited solubility of the dicyandiamide in this solvent, which can lead to considerable difficulties in the production and use of the epoxide resin mixture.

Therefore, it is an object of the present invention to provide a hardener solution based on dicyanidiamide which has an especially good dissolving ability for and compatibility with the epoxide resin mixture.

Thus, according to the present invention, there is provided a hardener solution for epoxide resin masses, based on dicyandiamide, wherein it contains (a) 50 to 90 parts by weight of dimethylformamide
(b) 5 to 50 parts by weight of a low boiling ketone and/or alcohol
(c) 5 to 32 parts by weight of dicyandiamide, referred to 100 parts by weight of the sum of components (a) and (b).

Surprisingly, we have found that the hardener solution according to the present invention possesses an outstanding dissolving ability for dicyandiamide not only alone but also in combination with the other components of the epoxide resin mixture. This prevents crystal separation taking place before or during the impregnation of glass-fibre reinforced fabrics, as well as during drying thereof.

Furthermore, the hardening times with the help of the solution according to the present invention are shortened due to synergistic effects between the dicyandiamide and the solvent mixture, which was also not foreseeable.

The hardener solution according to the present invention consists essentially of 50 to 95 parts by weight of dimethylformamide, 5 to 50 parts by weight of a low boiling ketone and/or alcohol and 5 to 32 parts by weight of dicyandiamide, referred to 100 parts by weight of the sum of components (a) and (b).

By low boiling ketones and alcohols, within the scope of the present invention there are to be understood those solvents which possess a boiling point of up to 150° C. As low boiling ketones, there are preferred acetone and/or methyl ethyl ketone but other ketones can also be used, for example diethyl ketone, dipropyl ketone, acetylacetone, vinyl methyl ketone and mesityl oxide. In the case of the low boiling alcohols, methanol, ethanol and 1-methoxy-2-propanol have proved to be especially useful but, in principle, other alcohols can also be used, for example n-propanol, isopropanol, n-butanol and n-pentanol. In any case, the boiling point of the solvent mixture should not be above 160° C. since the drying conditions in the production of glass fibre-reinforced epoxide resin laminates are fixed and do not permit higher boiling points.

In the hardener solution, the hardening agent dicyandiamide possesses an excellent solubility of up to 25% by weight at 20° C. and thus is markedly greater than the solubility of dicyandiamide in pure dimethylformamide. This is particularly surprising since dicyandiamide has only a poor solubility in the low boiling alcohols and ketones.

The hardner solution according to the present invention can possibly also contain conventional hardening accelerators, for example dimethylbenzylamine, in an amount of from 1 to 10% by weight and preferably of from 2 to 5% by weight, referred to the content of dicyandiamide.

This hardener solution is outstandingly suitable for the production of storage-stable epoxide resin solutions which usually have an epoxide resin content of from 40 to 60% by weight and are used for the impregnation of glass-fibre reinforced fabrics. As epoxide resin, there can be used all the conventional types which are commercially available. Thus, for example, epoxide resins can be used which are commercially available under the designations Epikote 828 or Araldit LZ 7065 N-75 SP. The hardener solution is added to the epoxide resin, which can possibly already be dissolved in an appropriate solvent, in such an amount that the dicyandiamide content amounts to 1 to 10% by weight, referred to the epoxide resin content. Under these conditions, too, even after storing the epoxide resin solution for several weeks, no crystallisation of the dicyandiamide and no change of viscosity of the solution are observed. Also after drying the impregnated fabric, no dicyandiamide crystals can be observed which would have a disturbing effect in the case of the production of the laminates.

The following Examples are given for the purpose of illustrating the present invention:

EXAMPLE 1

A 20% dicyandiamide solution is prepared from 20 g. dicyandiamide, 68 g. dimethylformamide and 12 g. acetone and used as a hardener solution for hardening a resin mass consisting of 50 parts by weight of Epikote 828, 7.5 parts by weight of dimethylformamide, 30 parts by weight of acetone and 12.5 parts by weight of hardener solution.

The resin mass obtained is dissolved clearly and, after storage for 3 weeks at ambient temperature, does not show any increase of viscosity. The gel time of a sample at 180° C. is 4 minutes.

A resin mass produced for comparison purposes, consisting of 50 parts by weight of Epikote 828, 30 parts by weight of acetone and 25 parts by weight of hardener solution, which consists of a 10% solution of dicyandiamide in monomethylglycol, gels under the same conditions after 5 minutes.

EXAMPLE 2

A 10% solution is prepared from 10 g. dicyandiamide, 45 g. dimethylformamide and 45 g. methyl ethyl ketone and used as hardening solution for the hardening of a resin mass consisting of 135 parts by weight of Araldite LZ 7065 N-75 SP, 30 parts by weight of hardener solution and 10 parts by weight of dimethylformamide.

The viscosity of the impregnation solution does not change over a period of time of 3 weeks. The gel time of a sample at 180° C. is 4.5 minutes.

EXAMPLE 3

A 20% solution is prepared from 20 g. dicyandiamide, 68 g. dimethylformamide and 12 g. 1-methoxy-2-propanol and used for hardening a resin mass consisting of 50 parts by weight of Epikote 828 and 12.5 parts by weight of hardener solution.

The viscous resin mass obtained is dissolved clearly and shows only a slight increase of viscosity after storage for 3 weeks. The gel time of a sample at 180° C. is 4 minutes.

EXAMPLE 4

A 20% solution is prepared from 20 g. dicyandiamide, 68 g. dimethylformamide and 12 g. methyl ethyl ketone and used for hardening a resin mass consisting of 133 parts by weight of Araldite LZ 7065 N-75 SP, 15 parts by weight of hardener solution, 12.5 parts by weight of dimethylformamide and 12.5 parts by weight of methyl ethyl ketone.

The viscosity of the impregnating solution remains stable. The gel time of a sample at 180° C. is 4.5 minutes.

EXAMPLE 5

The resin mixture described in Example 4 is mixed with 0.2 parts by weight of dimethylbenzylamine as hardening accelerator. A piece of glass fibre fabric is impregnated with this solution, squeezed out and dried in a drying cabinet at 160° C. for 10 minutes. The non-sticky prepreg thus obtained has a resin content of 35%. When observed under a polarisation microscope, no included dicyandiamide crystals can be ascertained.

I claim:

1. Dicyandiamide hardener solution for epoxide resin masses, consisting essentially of
   (a) 50 to 90 parts by weight of dimethylformamide,
   (b) 5 to 50 parts by weight of a low boiling ketone and/or alcohol and
   (c) 5 to 32 parts by weight of dicyandiamide, referred to 100 parts by weight of the sum of components (a) and (b)
   and optionally from 1 to 10% by weight referred to the dicyandiamide content, of a hardening accelerator.

2. The hardener solution of claim 1, wherein the low boiling ketone is acetone and/or methyl ethyl ketone.

3. The hardener solution of claim 1, wherein the low boiling alcohol is methanol, ethanol, 1-methoxy-2-propanol or a combination thereof.

4. The hardener solution of claim 1, containing the hardening accelerator in an amount of from 1 to 10% by weight, referred to the dicyandiamide content.

5. The hardener solution of claim 4, wherein the hardening accelerator is present in an amount of from 2 to 5% by weight, referred to the dicyandiamide content.

6. A method for the production of storage-stable epoxide resin solutions, comprising adding to the epoxide resin solution a hardener solution consisting essentially of (a) 50 to 90 parts by weight of dimethylformamide, (b) 5 to 50 parts by weight of a low boiling ketone and/or alcohol and (c) 5 to 32 parts by weight of dicyandiamide, referred to 100 parts by weight of the sum of components (a) and (b) in such an amount that the dicyandiamide content amounts to 1 to 10% by weight, referred to the epoxide resin content and optionally from 1 to 10% by weight referred to the dicyandiamide content, of a hardening accelerator.

7. The method of claim 6, wherein the low boiling ketone is acetone and/or methyl ethyl ketone.

8. The method of claim 6, wherein the low boiling alcohol is methanol, ethanol, 1-methoxy-2-propanol or a combination thereof.

9. The method of claim 6 wherein the hardener solution contains the hardening accelerator in an amount of from 1 to 10% by weight, referred to the dicyandiamide content.

* * * * *